United States Patent [19]
Greenwalt

[11] Patent Number: 5,958,107
[45] Date of Patent: Sep. 28, 1999

[54] SHIFT CONVERSION FOR THE PREPARATION OF REDUCING GAS

[75] Inventor: Richard B. Greenwalt, Danville, Calif.

[73] Assignee: Bechtel Croup, Inc., San Francisco, Calif.

[21] Appl. No.: 08/834,023

[22] Filed: Apr. 11, 1997

Related U.S. Application Data

[63] Continuation-in-part of application No. 08/167,268, Dec. 15, 1993, Pat. No. 5,558,696
[60] Provisional application No. 60/015,281, Apr. 12, 1996.

[51] Int. Cl.⁶ .................................................. C21B 13/14
[52] U.S. Cl. ........................................... 75/492; 75/505
[58] Field of Search ........................................ 75/505, 492

[56] References Cited

U.S. PATENT DOCUMENTS

| | | | |
|---|---|---|---|
| 3,850,615 | 11/1974 | Reeves | 75/26 |
| 4,070,181 | 1/1978 | Widell | 75/91 |
| 4,073,642 | 2/1978 | Collin et al. | 75/35 |
| 4,317,677 | 3/1982 | Weber et al. | 75/43 |
| 4,389,042 | 6/1983 | Wynne | 266/210 |
| 4,396,421 | 8/1983 | Stift et al. | 75/11 |
| 4,409,023 | 10/1983 | Weber et al. | 75/38 |
| 4,448,402 | 5/1984 | Weber et al. | 266/183 |
| 4,542,889 | 9/1985 | Vuletic | 266/137 |
| 4,543,123 | 9/1985 | Vuletic | 75/34 |
| 4,588,437 | 5/1986 | Kepplinger et al. | 75/43 |
| 4,605,205 | 7/1986 | Langner et al. | 266/160 |
| 4,673,432 | 6/1987 | Hauk | 75/38 |
| 4,708,736 | 11/1987 | Hauk et al. | 75/26 |
| 4,725,308 | 2/1988 | Kepplinger | 75/26 |
| 4,728,360 | 3/1988 | Hauk et al. | 75/26 |
| 4,755,219 | 7/1988 | Hauk | 75/10.22 |
| 4,784,689 | 11/1988 | Vuletic | 75/38 |
| 4,793,855 | 12/1988 | Hauk | 75/26 |
| 4,793,857 | 12/1988 | Vuleti | 75/34 |
| 4,805,880 | 2/1989 | Hauk et al. | 266/87 |
| 4,806,154 | 2/1989 | Hauk | 75/10.19 |
| 4,806,158 | 2/1989 | Hirsch et al. | 75/26 |
| 4,822,411 | 4/1989 | Standler et al. | 75/35 |
| 4,846,449 | 7/1989 | Hauk et al. | 266/172 |
| 4,849,015 | 7/1989 | Fassbinder et al. | 75/26 |
| 4,850,574 | 7/1989 | Vuletic | 266/146 |
| 4,854,967 | 8/1989 | Hauk | 75/34 |
| 4,857,284 | 8/1989 | Hauk | 423/231 |
| 4,865,626 | 9/1989 | Papst et al. | 48/210 |
| 4,874,427 | 10/1989 | Hamada et al. | 75/26 |
| 4,878,943 | 11/1989 | Kepplinger | 75/25 |
| 4,889,323 | 12/1989 | Pusch et al. | 266/142 |
| 4,891,062 | 1/1990 | Vuletic et al. | 75/28 |
| 4,895,593 | 1/1990 | Sulzbacher et al. | 75/26 |

(List continued on next page.)

FOREIGN PATENT DOCUMENTS 468950  1/1991  European Pat. Off. .

OTHER PUBLICATIONS

Fleichtner, et al., "The Corex Process," Skillings' Mining Review, pp. 20–27 (Jan. 14, 1989).

Lemperle, et al., "Co–Generation with Corex®," Presented During 1991 AISE Annual Convention, Pittsburgh, Pennsylvania (Sep. 1991).

Reifferscheild et al, "Hydrogen Reduction of Iron Fines in Stationary Fluidsed Beds," *Int. Symp. on Global Environment and Iron and Steel Industry*(ISES '98); Apr. 14–16 1998. Beijing, China) 6 pages.

Thomas M. Scarnati (ed.); "HYL Report", (Summer 1997) pp. 2, 4–8 and 10.

Knop et al. "Hydrogen–Based Direct Reduction–Process Engineering and Costs," *MPT International*(Mar. 1, 1997), pp. 50–55.

*Primary Examiner*—Melvyn Andrews
*Attorney, Agent, or Firm*—David G. Beck; Townsend and Townsend and Crew

[57] ABSTRACT

A method of shift conversion of CO to $H_2$ so that the level of gas can be reduced to a level that preheating for direct reduction to 800 to 900° C. can be accomplished wherein carbon deposition is not a factor.

11 Claims, 2 Drawing Sheets

U.S. PATENT DOCUMENTS

| | | | |
|---|---|---|---|
| 4,897,179 | 1/1990 | Mori et al. | 208/107 |
| 4,898,366 | 2/1990 | Vuletic et al. | 266/160 |
| 4,913,733 | 4/1990 | Hauk | 75/491 |
| 4,946,498 | 8/1990 | Weber | 75/26 |
| 4,955,587 | 9/1990 | Sulzbacher et al. | 266/156 |
| 4,957,545 | 9/1990 | Hirosaka et al. | 75/501 |
| 4,958,808 | 9/1990 | Hauk | 266/154 |
| 4,978,387 | 12/1990 | Kepplinger | 75/445 |
| 5,043,011 | 8/1991 | Hauk | 75/446 |
| 5,259,864 | 11/1993 | Greenwalt | 75/445 |
| 5,259,865 | 11/1993 | Greenwalt | 75/445 |
| 5,320,676 | 6/1994 | Greenwalt | 75/445 |
| 5,338,336 | 8/1994 | Greenwalt | 75/445 |
| 5,354,356 | 10/1994 | Greenwalt | 75/445 |
| 5,380,352 | 1/1995 | Greenwalt | 75/445 |
| 5,397,376 | 3/1995 | Greenwalt | 75/445 |
| 5,413,622 | 5/1995 | Greenwalt | 75/446 |
| 5,470,375 | 11/1995 | Greenwalt | 75/505 |
| 5,558,696 | 9/1996 | Greenwalt | 75/505 |
| 5,676,732 | 10/1997 | Viramontes-Brown et al. | 75/492 |

FIG. 1.

| | | FRESH FEED | FEED TO SATURATOR | CO SHIFT BY-PASS | FEED TO CO SHIFT |
|---|---|---|---|---|---|
| | | VOL% / NM3 | | | |
| CO2 | | 26 / 40430.0 | 26 / 36387.0 | 26 / 3638.7 | 12.4 / 36387.0 |
| CO | | 43.3 / 67331.5 | 43.3 / 60598.4 | 43.3 / 6059.8 | 20.6 / 60598.4 |
| H2 | | 18.7 / 29078.5 | 18.7 / 26170.7 | 18.7 / 2617.0 | 8.9 / 26170.7 |
| H2O | | 1.4 / 2177.0 | 1.4 / 1959.3 | 1.4 / 195.9 | 53.0 / 155904.3 |
| CH4 | | 1.7 / 2643.5 | 1.7 / 2379.2 | 1.7 / 237.9 | 0.8 / 2379.2 |
| INERTS | | 8.9 / 13839.5 | 8.9 / 12455.6 | 8.9 / 1245.6 | 4.2 / 12455.6 |
| H2S | PPM | 80 | | | |
| PRESSURE | BARG | 5 | | | |
| TEMP | °C | 45 | | | |
| FLOWRATE | NM3 | 155500.0 | 139950.0 | 13995.0 | 293895.0 |
| | | | 0.9 | 0.1 | 1.1 |
| | | | FEED SPLIT | FEED SPLIT | STEAM DILUTION |

| | | CO SHIFT EFFLUENT | FEED TO CO2 UNIT | CO2 UNIT EFFLUENT | FEED TO RE-HEATER |
|---|---|---|---|---|---|
| | | VOL% / NM3 | | | |
| CO2 | | 30.9 / 90925.5 | 44.9 / 94564.2 | 1891.3 | 4.2 / 5530.0 |
| CO | | 2.1 / 6059.8 | 5.8 / 12119.7 | 12119.7 | 13.8 / 18179.5 |
| H2 | | 27.5 / 80709.2 | 39.6 / 83326.2 | 83326.2 | 65.2 / 85943.3 |
| H2O | | 34.5 / 101365.8 | 2.0 / 4250.6 | 4250.6 | 3.4 / 4446.5 |
| CH4 | | 0.8 / 2379.2 | 1.2 / 2617.1 | 2617.1 | 2.2 / 2855.0 |
| INERTS | | 4.2 / 12455.6 | 6.5 / 13701.1 | 13701.1 | 11.3 / 14946.7 |
| H2S | PPM | 80 | | | |
| PRESSURE | BARG | 5 | | | |
| TEMP | °C | 45 | | | |
| FLOWRATE | NM3 | 293895.0 | 210578.8 | 117905.9 | 131900.9 |
| | | 0.9 | 0.96 | 0.98 | |
| | | CO SHIFT CONVERSION | WATER REMOVAL | CO2 REMOVAL | |

SHIFT CONVERSION FOR THE PREPARATION OF REDUCING GAS

This application is a continuation-in-part of U.S. patent application Ser. No. 08/167,268, Dec. 15, 1993, now U.S. Pat. No. 5,558,696, and claims priority from U. S. Provisional Patent Application Ser. No. 60/015,281, filed Apr. 12, 1996, the disclosures of which are incorporated herein by reference for all purposes.

This application is also related to the following U.S. patents by the same inventor and assigned to the same assignee U.S. Pat. No. 5,259,864, issued Nov. 9, 1993; U.S. Pat. No. 5,259,865, issued Nov. 9, 1993; U.S. Pat. No. 5,320,676, issued Jun. 14, 1994; U.S. Pat. No. 5,354,356, issued Nov. 11, 1994; U.S. Pat. No. 5,397,376, issued Mar. 14, 1995; and U.S. Pat. No. 5,413,622, issued May 9, 1995, all of which are incorporated herein by reference for all purposes.

BACKGROUND OF THE INVENTION

In the preparation of sponge or direct reduced iron utilizing COREX® gas containing high levels of $CO_2$ gas (25 to 30%), the gas has heretofore been treated for removal of $CO_2$ by wet chemical or pressure adsorption methods. It is essential for subsequent direct reduction to remove $CO_2$ to low levels (2 to 5%) resulting in a high $CO/CO_2$ ratio (>1 to 1). At these high $CO/CO_2$ ratios the gas is subject to carbon deposition during reheating especially in the range from 500 to 800° C. by virtue of the following reversible reaction:

$$2CO = C + CO_2$$

The subject carbon deposition is detrimental to gas preheater tubes which carburize and deteriorate.

DESCRIPTION OF THE INVENTION

It is the subject of this invention that by usage of partial or total shift conversion of CO to $H_2$ that the CO content of the process gas can be reduced to a level that preheating for direct reduction to 800 to 900° C. can be accomplished and carbon deposition is not a factor. The shift conversion of CO is accomplished with steam ($H_2Ov$) over a catalyst by the following exothermic reaction:

$$CO + H_2O = CO_2 + H_2$$

In addition, increased $H_2$ is a preferred reductant for direct reduction in that it is a more potent reductant, there is less degradation of the iron oxide particles during reduction compared to the high CO reducing gas and the $H_2$ reduction reaction is endothermic rather than exothermic. The CO reduction of iron oxide is exothermic which can lead to overheating and cause clustering of the iron ore bed during direct reduction. This latter condition is objectionable as the clustering interrupts flow through the direct reduction shaft furnace leading to stoppage for cluster removal and loss of productivity.

| Basis of the Design | |
|---|---|
| Gas composition: | |
| $CO_2$ | 26.0 vol % |
| CO | 43.3 |
| $H_2$ | 18.7 |
| $H_2O$ | 1.4 |
| $CH_4$ | 1.7 |
| Inerts | 8.9 |
| $H_2S$ | 80 ppm |
| Pressure | 5 bar (g) |
| Temperature | 45 °C. |
| Flowrate | 155 500 $Nm^3$ |

Process Description—Shift Conversion

Part (±50%) of the steam for shift conversion is added by means of water, as dilutant and reactant, to the saturator vessel for saturation of the process gas to supplement the required amount of steam. By controlling the temperature and the pressure of the top of the saturator, the amount of water picked up by the process gas is controlled. The remaining required steam for the conversion is added as "live steam." The live steam is required to prevent the catalyst from sintering and the saturator itself cannot provide enough water for the gas.

By using a saturator, it is possible to use low level heat from the reactor effluent to introduce steam into the process gas. Using a saturator makes the use of a dilution steam generator superfluous and represents an economical method of inducing steam into the process gas. The water that is not used in the shift reaction is separated from the process gas in the desaturator. The water condensate is partly returned to the saturator as makeup for the water balance on the saturator and partly sent to recycle.

The gas feed can be split into streams, one to bypass the CO shift unit (10 vol %) and one to pass through the saturator/CO shift/desaturator system (90 vol %). Larger bypasses of the CO shift unit leads to $CO_2$ levels exceeding the 5 vol % before reheating of the reducing gas.

The CO conversion takes place in two steps. In the first step 70% of the feed gas (98 000 $Nm^3$/h) is preheated, passed through the saturator and saturated with water (61.9 ton). After the saturator, the live steam (61.9 ton) is injected and the steam rich stream is further heated to 320° C. against the CO shift reactor effluent and sent to the first bed of the CO shift converter. The remaining feed gas (42 000 $Nm^3$/h) is injected between the first and second bed of the CO shift converter, reducing the temperature of the reacting gases from 410° C. to approximately 330° C. The outlet temperature for the CO shift reactor is 380° C. and the CO conversion 90%.

The gas leaving the CO converter is then cooled against the CO shift feed gas, the saturator water circulation and aircoolers to 70° C. The condensed water from the desaturator is partly sent back to the saturator (61.9 ton), making up for the absorbed water and partly sent to the recycle reboiler (16 ton). The saturator water circulation is 585 $m^3$/h. The ratio of $CO/CO_2$ is in the range of 3.3, which eliminates problems with carbon deposition when the gas is reheated. Higher $CO/CO_2$ ratios are possible, but the $CO_2$ content then starts to exceed the 5 vol %. Gas leaving the saturator has $CO_2$ removed in the MDA or VPSA unit and is directed to the reheater. Bypass gas is also sent to the reheater, and the combined gases are reheated to, for example, 900°for use in direct reduction or for other purposes.

FIGURES

FIG. 1 shows operating conditions with regard to the basis of the design described above; and FIG. 2 is a flow diagram illustrating the method of the present invention.

DETAILED DESCRIPTION OF THE INVENTION

Figure 2:
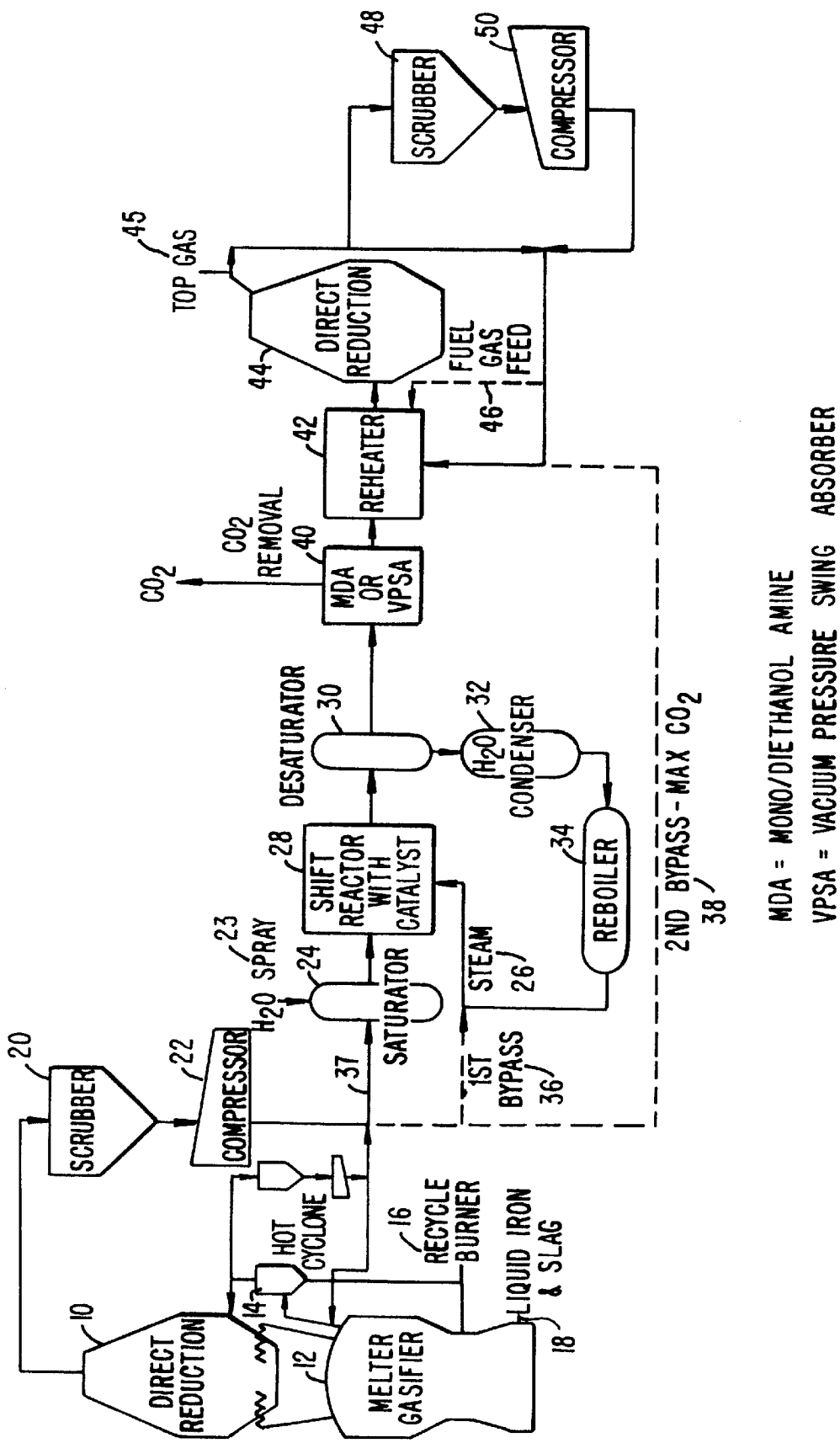

Referring to the drawings and to FIG. 2, in particular, a flow diagram of the invention is shown in detail. The invention provides for use of partial or total shift conversion of CO to $H_2$ so that the CO content of process gas containing CO and $CO_2$ can be reduced to a level so that preheating for direct reduction to 800–900° C. can be accomplished and carbon deposition is not a factor. The invention is applicable for treating process gas from many industrial processes.

For example, in a melter-gasifier unit, process gas leaving the direct reduction unit 10 of the melter gasifier 12 proceeds through scrubber 20 and compressor 22. Coming out of the compressor 22 a portion of the gas is flowed through a saturator 24/shift reactor 28/desaturator 30 system through lines 37 and 36, and a portion is totally bypassed via line 38.

Part (±50%) of the steam for shift conversion is added by means of water, such as by $H_2O$ spray 23, as dilutant and reactant, to the saturator vessel 24 for saturation of the process gas to supplement the required amount of steam. By controlling the temperature and the pressure of the top of the saturator 24, the amount of water picked up by the process gas is controlled. The remaining required steam for the conversion is added as "live steam." The live steam is required to prevent the catalyst from sintering in shift reactor 28, and the saturator 24 itself cannot provide enough water for the gas.

By using a saturator, it is possible to use low level heat from the reactor effluent to introduce steam into the process gas. Using a saturator makes the use of a dilution steam generator superfluous and represents an economical method of inducing steam into the process gas. The water that is not used in the shift reaction is separated from the process gas in the desaturator 30. The water condensate is partly returned to the saturator as makeup for the water balance on the saturator and partly sent to recycle.

The process gas feed is initially, divided into flow streams, one to bypass the CO shift unit 28 (10 vol %) via line 38, and another to pass through the saturator 24/CO shift 28/desaturator 30 system (90 vol %) via lines 36, 37. Increased bypasses through line 38 of the CO shift unit leads to $CO_2$ levels exceeding the 5 vol % before reheating of the reducing gas.

The CO conversion takes place in two steps. In the first step 70% of the feed gas (98 000 $Nm^3/h$) is preheated and passed through line 37 to the saturator 24 and saturated with water (61.9 ton) by the $H_2O$ spray 23. After the saturator 24, the live steam 26 (61.9 ton) is injected from the reboiler 34, and the steam-rich stream is further heated to 320° C. against the CO shift reactor effluent and sent to the first bed of the CO shift converter 28. The remaining feed gas (42 000 $Nm^3/h$) is injected via line 36 between the first and second bed of the CO shift converter 28, reducing the temperature of the reacting gases from 410° C. to approximately 330° C. The outlet temperature for the CO shift reactor 28 is 330° C. and the CO conversion 90%.

The gas leaving the CO converter 28 is then cooled against the CO shift feed gas, the saturator water circulation and aircoolers to 70° C. The condensed water 32 from the desaturator is partly sent back to the saturator 24 (61.9 ton), making up for the absorbed water and partly sent to the recycle reboiler (16 ton). The saturator water circulation is 585 $m^3/h$. The ratio of $CO/CO_2$ is in the range of 3.3, which eliminates problems with carbon deposition when the gas is reheated. Higher $CO/CO_2$ ratios are possible, but the $CO_2$ content then starts to exceed the 5 vol %. Gas leaving the saturator has $CO_2$ removed in the MDA or VPSA unit and is directed to the reheater 42. Bypass gas is also sent to the reheater 42, and the combined gases are reheated to, for example, 900° for use in direct reduction or for other purposes.

The principles, preferred embodiments and modes of operation of the present invention have been described in the foregoing specification. However, the invention which is intended to be protected is not to be construed as limited to the particular embodiments disclosed. The embodiments are to be construed as illustrative rather than restrictive. Variations and changes may be made by others without departing from the spirit of the present invention. Accordingly, all such variations and changes which fall within the spirit and scope of the present invention is defined in the following claims are expressly intended to be embraced thereby.

I claim:

1. A method of treating a gasifier process gas stream, the method comprising the steps of:

drawing off said gasifier process gas stream from a gasifier unit of an iron production system, wherein said iron production system is selected from the group consisting of melter-gasifier systems and direct reduction systems;

separating said gasifier process gas stream into a first process gas stream and a second process stream;

separating said first process gas stream into a first portion and a second portion;

heating said first portion of said first process gas stream;

flowing said heated first portion into a saturator;

adding water to said saturator, wherein said added water is sufficient to saturate said first portion of said first process gas stream;

injecting steam into said saturated first portion;

heating said steam injected first portion;

passing said heated steam injected first portion over a first bed of a CO shift converter;

injecting said second portion of said first process gas stream into an output stream of said first bed, said injection of said second portion cooling said first bed output stream;

passing said cooled output stream over a second bed of said CO shift converter;

cooling an output stream of said second bed of said CO shift converter;

separating condensed water from said second bed output stream;

removing $CO_2$ from said cooled second bed output stream; and combining said cooled second bed output stream with said second process gas stream.

2. The method of claim 1, wherein said first portion is approximately 70 percent by volume of said first process gas stream and said second portion is approximately 30 percent by volume of said first process gas stream.

3. The method of claim 1, wherein said added water is water spray.

4. The method of claim 1, wherein said step of heating said steam injected first portion heats said steam injected first portion to approximately 320° C.

5. The method of claim 1, wherein said step of injecting said second portion of said first process gas stream into said first bed output stream cools said first bed output stream to approximately 330° C.

6. The method of claim 1, wherein said first bed and said second bed of said CO shift converter have a combined CO conversion of approximately 90 percent.

7. The method of claim 1, wherein said second bed output stream has an outlet temperature of approximately 380° C.

8. The method of claim 1, wherein said $CO_2$ removal step uses a mono/diethanol amine process.

9. The method of claim 1, wherein said $CO_2$ removal step uses a vacuum pressure swing absorber.

10. The method of claim 1, wherein hydrogen is a product of said $CO_2$ removal step.

11. The method of claim 1, wherein said first process gas stream is about 90% of the volume of said process gas stream, and said second process gas stream is about 10% of the volume of said process gas stream.

* * * * *